United States Patent
Nakagawa et al.

(10) Patent No.: US 6,950,273 B2
(45) Date of Patent: Sep. 27, 2005

(54) MAGNETIC DISK DEVICE

(75) Inventors: Shinsuke Nakagawa, Tsuchiura (JP); Kiyotada Ito, Odawara (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 10/136,317

(22) Filed: May 2, 2002

(65) Prior Publication Data

US 2003/0076617 A1 Apr. 24, 2003

(30) Foreign Application Priority Data

Oct. 23, 2001 (JP) ........................................ 2001-324521

(51) Int. Cl.$^7$ .............................................. G11B 5/596
(52) U.S. Cl. ................................................... 360/78.14
(58) Field of Search ........................... 360/78.14, 78.06, 360/77.08, 77.04, 75

(56) References Cited

U.S. PATENT DOCUMENTS

| | | | | |
|---|---|---|---|---|
| 5,402,400 A | * | 3/1995 | Hamada et al. | 360/78.06 |
| 6,115,203 A | * | 9/2000 | Ho et al. | 360/77.04 |
| 6,292,324 B1 | * | 9/2001 | Ho et al. | 360/77.04 |
| 6,545,835 B1 | * | 4/2003 | Codilian et al. | 360/77.04 |
| 6,549,362 B1 | * | 4/2003 | Melrose et al. | 360/77.04 |
| 6,587,302 B2 | * | 7/2003 | Ahn | 360/77.04 |
| 6,654,198 B2 | * | 11/2003 | Liu et al. | 360/77.04 |
| 6,678,108 B2 | * | 1/2004 | Smith et al. | 360/77.04 |
| 6,693,764 B1 | * | 2/2004 | Sheh et al. | 360/77.08 |
| 6,707,635 B1 | * | 3/2004 | Codilian et al. | 360/77.04 |
| 6,721,120 B2 | * | 4/2004 | Min et al. | 360/75 |

FOREIGN PATENT DOCUMENTS

WO    WO 01/08139    2/2001

* cited by examiner

*Primary Examiner*—David Hudspeth
*Assistant Examiner*—Fred F. Tzeng
(74) *Attorney, Agent, or Firm*—Antonelli, Terry, Stout and Kraus, LLP.

(57) ABSTRACT

The position error signal (PES), representing relative position regarding position information (RRO) previously recorded on a magnetic disk and the magnetic head, is averaged in each servo sector by an averaging unit, and a control input is obtained based on the PES by a phase compensator and the control input undergoes an averaging process in each servo sector by another averaging unit. Convolution integration with respect to the signal data processed by those averaging units is carried out by using a transfer characteristic formed by adding 1 to an open-loop transfer characteristic, which is determined by a magnetic head actuator model and a servo control circuit, to obtain a synchronous vibration estimate. This estimate undergoes a high-pass filtering process of a zero phase error characteristic by the filter unit to remove the vibration component of low frequency band and to thereby obtain a synchronous vibration learned value with high precision.

21 Claims, 11 Drawing Sheets

52: PHASE COMPENSATOR    48: HEAD ACTUATOR    50,52: AVERAGING PROCESS UNIT

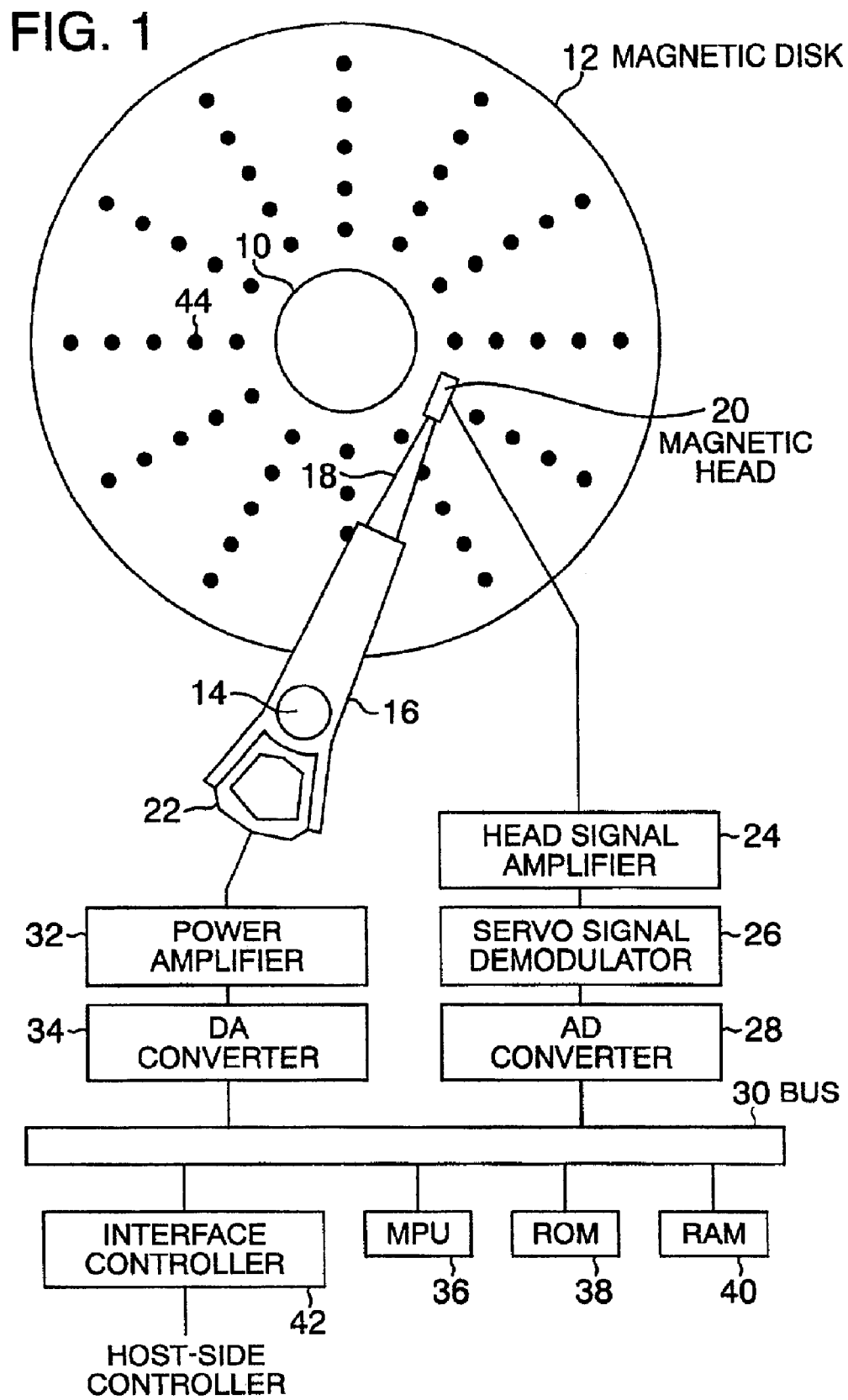

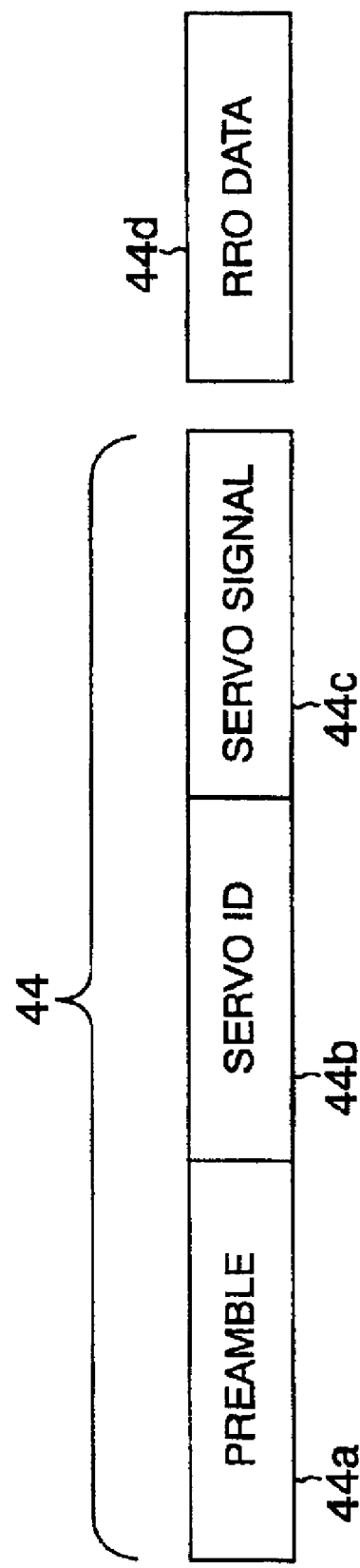

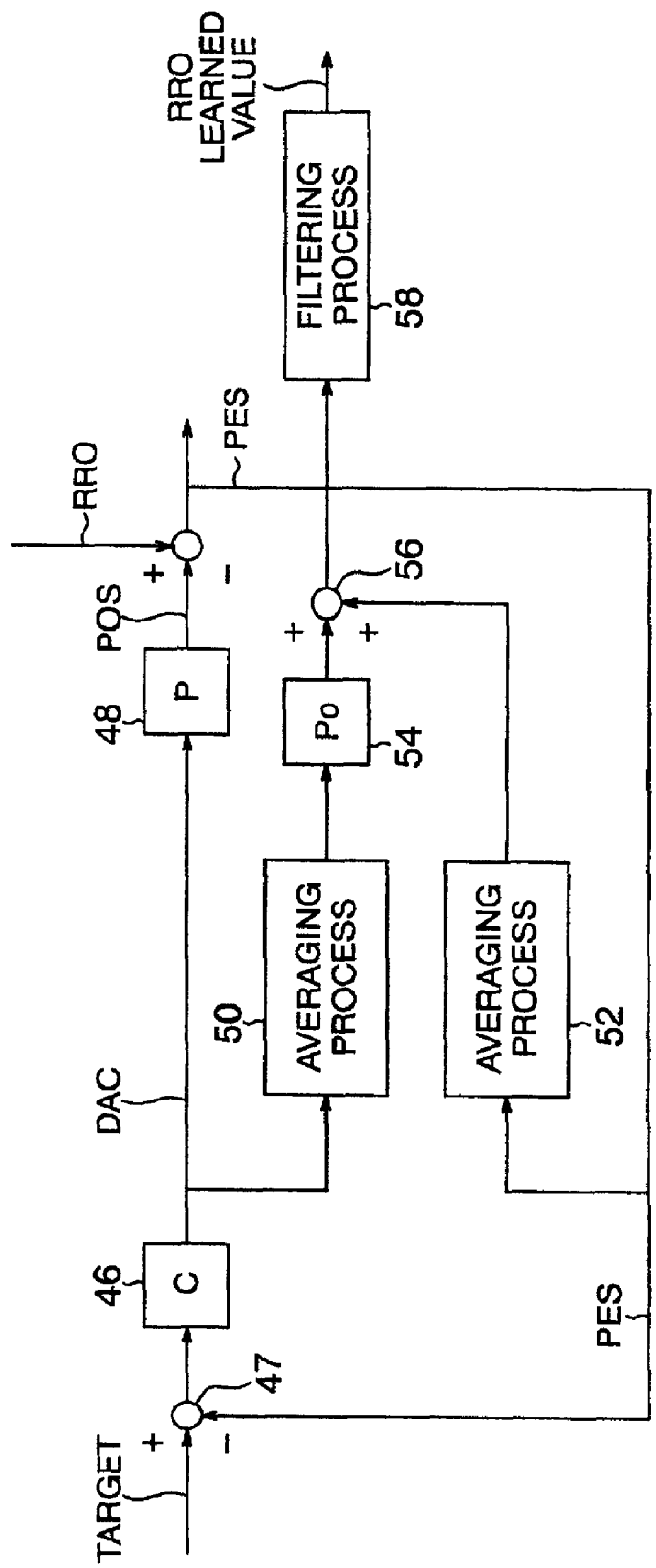

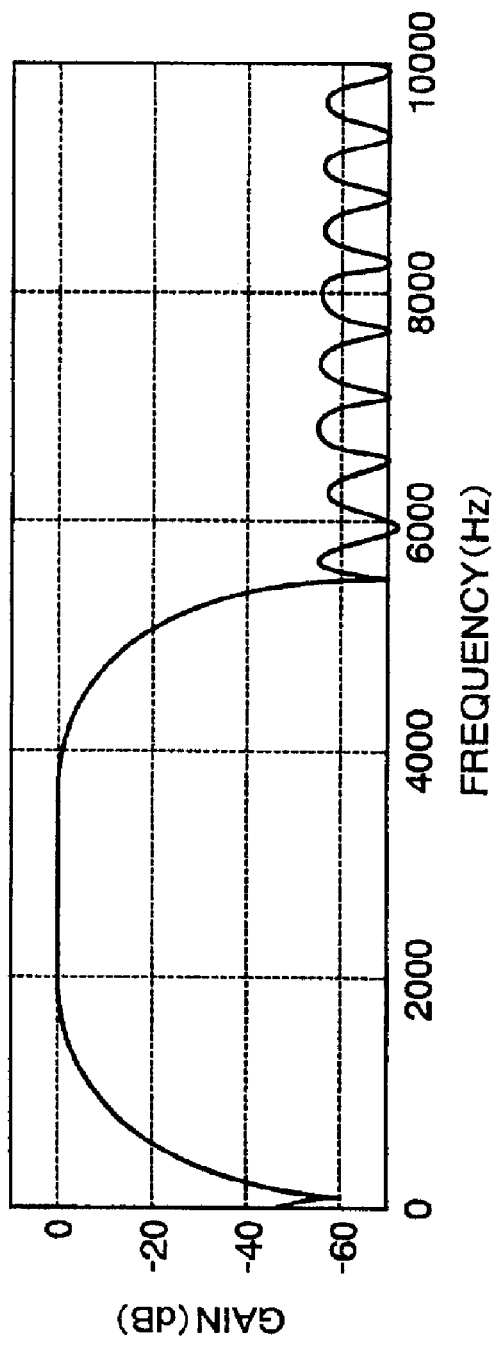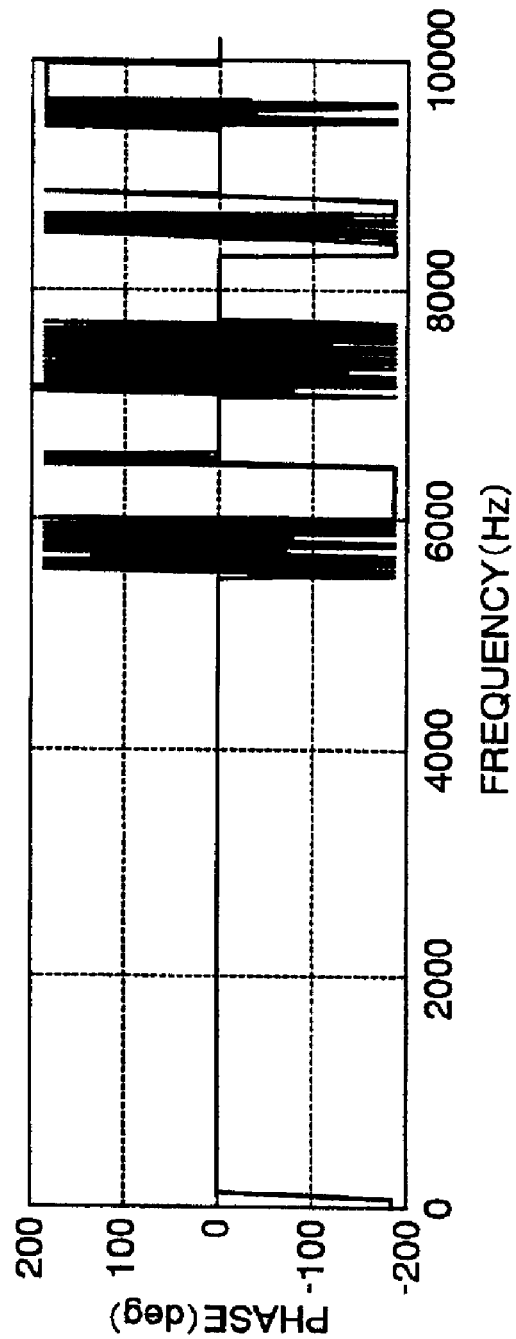
FIG. 10A
FIG. 10B

MAGNETIC DISK DEVICE

BACKGROUND OF THE INVENTION

The present invention relates to a magnetic disk device, and more particularly to a magnetic disk device, which is suitable for positioning a magnetic head for recording and reproducing data, to a target track.

The magnetic disk devices are used as external storages for computers. In the magnetic disk device, a magnetic head is moved to a target track on a rotating magnetic disk to record and reproduce data on it. To realize a high track density of magnetic disk devices, it is essential to reduce the amplitude of the vibrations of vibration sources and improve the resistance to disturbances. The vibrations synchronous with the rotation of the disk (synchronous vibration: RRO) are chiefly the disk vibration when position information for servo was written (servo track write: STW) and the head actuator vibration written on the disk, and the vibration frequencies of large amplitude occur in the neighborhood of 2 kHz, which are a frequency band where the suppression performance of the servo system is lowest.

In other words, when the magnetic disk is used as storage, position information for servo is written on the disk by using an external actuator, or a laser length measuring system. In this servo track write operation, position information is written accompanied by vibrations of the disk and the head actuator, so that the position information includes values that deviate from a truly circular track (a locus of the head that should desirably be).

U.S. Pat. No. 6,097,565 discloses a technique to compensate for the synchronous vibration (RRO) to reduce the effects of the synchronous vibration, which comprises estimating positional displacements from a truly circular track, included in the servo signal written on the disk, by an arithmetic operation using an inverse characteristic of the servo characteristic (an inverse sensitivity function), adding an estimate, with its sign inverted, to the measured position to compensate for the synchronous vibration (RRO) to change the target position signal, which the head follows, to a truly circular track.

More specifically, in a control system for generating a position error (PES) between a head position (POS) and a target track (RRO), a control input (DAC) by a servo control unit (C) is obtained based on the above-mentioned position error data, and the head is positioned by driving the head actuator (P) according to the control input, position error data (PES) is collected as the position error signal on a sector-to-sector basis, the collected position error signal data is averaged on a sector-to-sector basis to obtain position-error component (RPES) synchronous with the rotation of the disk, and convolution integration with respect to the above-mentioned component is carried out by using an inverse sensitivity function (a transfer characteristic formed by adding 1 to an open-loop transfer characteristic Po•C (Po denotes a model of the head actuator and C denotes the servo control unit)), to obtain an estimate of the synchronous vibration. The synchronous vibration estimate is recorded as additional data near the position recorded on the disk, and when data is recorded or reproduced, the synchronous vibration estimate is reproduced together with servo information, and a reproduced synchronous vibration estimate is added, with its sign inverted, to the position error signal (PES), a deviation of the synchronous vibration estimate from the position error signal is obtained as a controlled amount after the synchronous vibration is compensated, a control input (DAC) is obtained based on the controlled amount, and therefore by driving the head actuator by the controlled amount, synchronous vibration compensation is implemented to change the target position signal so that the head follows a truly circular track on the disk.

In the prior art, in calculation of the synchronous vibration estimates, it has been a general practice to execute a process to extract rotation-synchronous component data from the position error signal and also execute a process of convolution-integrating an inverse sensitivity function with respect to the extracted rotation-synchronous component data. Therefore, in learning synchronous vibration to extract rotation-synchronous component data, it is considered important from a viewpoint of cost reduction in the manufacturing facility to finish this learning operation in as short a time as possible without deteriorating the compensation performance. To this end, it is most effective to reduce the number of times of execution of the averaging process to extract synchronous vibration data during the learning operation. However, the reduction of the number of times of execution of the averaging process causes the asynchronous component not to be compressed sufficiently, and the asynchronous components are superposed on the synchronous vibration components.

In other words, the position error signal (PES) contains the rotation-synchronous vibration component and the asynchronous vibration component, and if the number of times of carrying out the averaging process of the position error signal is increased to ten times or more, for example, the asynchronous vibration component approaches 0, but if the number of times of execution of the averaging process is decreased to not more than three, the asynchronous vibration component is not compressed but superposed on the synchronous vibration component after the averaging process of the position error signal. Particularly, when the number of times of execution of the averaging process is small, the asynchronous vibration component increases at low frequencies, resulting in a decrease in precision of the synchronous vibration estimates, and the synchronous vibration component becomes erroneous. The error compression characteristic (1/(1+PC)) of the servo system is large especially in vibration component data of the first to third rotations or so. This leads to follow the misestimated synchronous vibration component data in an early few of rotations, and crosstalks occur between adjacent tracks.

As disclosed in JP-A-7-98948, it may be possible to perform a filtering process on generating synchronous vibration component in real-time, but if the pre-filtering process is not applied to estimate the synchronous vibration component, learned values with high precision can not be obtained.

SUMMARY OF THE INVENTION

The object of the present invention is to provide a magnetic disk device capable of producing learned values of synchronous vibration component estimates with high precision even if the number of times of the averaging process carried out on the position error signal is decreased.

According to a first aspect of the present invention, to achieve the above object, a magnetic disk drive comprises a position error signal calculating unit for calculating, according to information reproduced from said magnetic head, a position error signal as a difference between a position signal and a target position of said magnetic head, said position signal showing a relative position of said magnetic head to record or reproduce information to or from a magnetic disk with respect to position information previously recorded on said magnetic disk; a control input calculating unit for calculating a control input based on said position error signal; a positioning control unit for positioning said magnetic head to a target position according to said control input; a filtering process unit for filtering said position error signal; and a synchronous vibration learned value calculating unit for averaging filtered position error signal, and calculating, as a synchronous vibration learned value, a synchronous vibration estimate representing an estimate of a synchronous vibration component synchronous with the rotation of said magnetic disk, based on said signal averaged.

According to a second aspect of the present invention, adapted to perform a filtering process at a stage subsequent to the averaging process during the synchronous vibration learning operation, a magnetic disk device comprises a position error signal calculating unit for calculating, according to information reproduced from said magnetic head, a position error signal as a difference between a position signal and a target position of said magnetic head, said position signal showing a relative position of said magnetic head to record or reproduce information to or from a magnetic disk with respect to position information previously recorded on said magnetic disk; a control input calculating unit for calculating a control input based on said position error signal; a positioning control unit for positioning said magnetic head to a target position according to said control input; a synchronous vibration learned value calculating unit for averaging said position error signal, and calculating a synchronous vibration estimate representing an estimate of a synchronous vibration component synchronous with the rotation of said magnetic disk, based on said signal averaged; and a filtering process unit for filtering said synchronous vibration estimate to find a synchronous vibration learned value.

When configuring each of the above-mentioned disk drives, the following elements may be added.

(1) The synchronous vibration estimate calculating unit averages position error signal in the same sector as signal data to be averaged, and obtains a position error signal synchronous with the rotation of the magnetic disk, and calculates the synchronous vibration estimate by convolution integration with respect to this position error signal by using a transfer characteristic formed by adding 1 to an open-loop transfer characteristic, which is determined by a model of the magnetic head actuator and the servo controller.

(2) The filtering process unit includes a linear phase high-pass filter as a filter to remove the asynchronous component of low frequency band, stores, for each input signal, the filtered signal as a value at a time after passage of an amount of a delay time caused by the filter to suppress a phase difference between input and output signals to zero.

(3) The filtering process unit includes a linear phase band pass filter as a filter to remove the asynchronous component of low frequency band, and stores, for each input signal, the filtered signal as a value at a time after passage of an amount of a delay time caused by the filter to suppress a phase difference between input and output signals to zero.

(4) The filtering process unit includes a linear phase high-pass filter as a filter to remove the asynchronous component of low frequency band and a band stop filter, and stores, for each input signal, the filtered signal as a value after passage of an amount of a delay time by the filter to suppress a phase difference between input and output signals to zero.

(5) A learned-value recording directing unit is provided to direct the magnetic head to record the synchronous vibration learned value in a position close to position information recorded on the magnetic disk.

(6) A deviation calculating unit is provide to subtract the synchronous vibration learned value, obtained according to reproduced information by the magnetic head, from the position error signal, and the control input calculating unit calculates a control input by using the deviation after the synchronous vibration is compensated.

According to the means mentioned above, a synchronous vibration learned value is calculated by filtering the position error signal or the synchronous vibration estimate at a stage before or after the averaging process in the synchronous vibration learning operation, for which reason the asynchronous vibration component of low frequency band included in the position error signal can be removed, even if the number of times of averaging the position error signal is small, the synchronous vibration learned value (a learned value of the synchronous vibration estimate) can be obtained with high precision, thus making it possible to reduce cost in the production facility.

When the filtering process is carried out, a synchronous vibration learned value can be calculated with high precision by using a filter of linear phase characteristic. In other words, in the filter of linear phase characteristic, the group delay time MT is constant at all frequencies, and therefore, by storing, for each input signal u(kT), a filtered signal Y as a value Y (kT–MT) after passage of an amount of delay time, the phase difference is zero in a relation of time series data between input and output signals u–y, so that a synchronous vibration component can be extracted from the position error signal with high precision, and the precision of the synchronous vibration learned value can be improved.

When a synchronous vibration learned value is recorded in a position near position information on the magnetic disk, by obtaining a subtraction of the synchronous vibration learned value obtained according to reproduced information by the magnetic head from the position error signal, obtaining a control input by using this subtraction as a controlled amount after the synchronous vibration is compensated, and by driving the head actuator according to the control input, the target position signal that the head follows can be made a locus of a truly circular track.

According to the present invention, it is arranged that a synchronous vibration learned value is calculated by subjecting a position error signal to a filtering process and also subjecting a synchronous vibration estimate to a filtering process at a stage before or after the averaging process in the synchronous vibration learning operation, and therefore the asynchronous vibration component of low frequency band included in the position error signal can be removed, a synchronous vibration learned value can be obtained with high precision even if the number of times of execution of the averaging process on the position error signal is decreased, and cost reduction in the production facility can be achieved by a reduction of learning time.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram of the head positioning control system of a magnetic disk drive according to the present invention;

FIG. 2 is a structural diagram of a servo sector;

FIG. 3 is a block diagram of the synchronous vibration learning control system according to the present invention;

FIGS. 10A and 10B are filter characteristic diagrams of a filter with a band-pass characteristic.

DESCRIPTION OF THE EMBODIMENTS

Figure 4A:
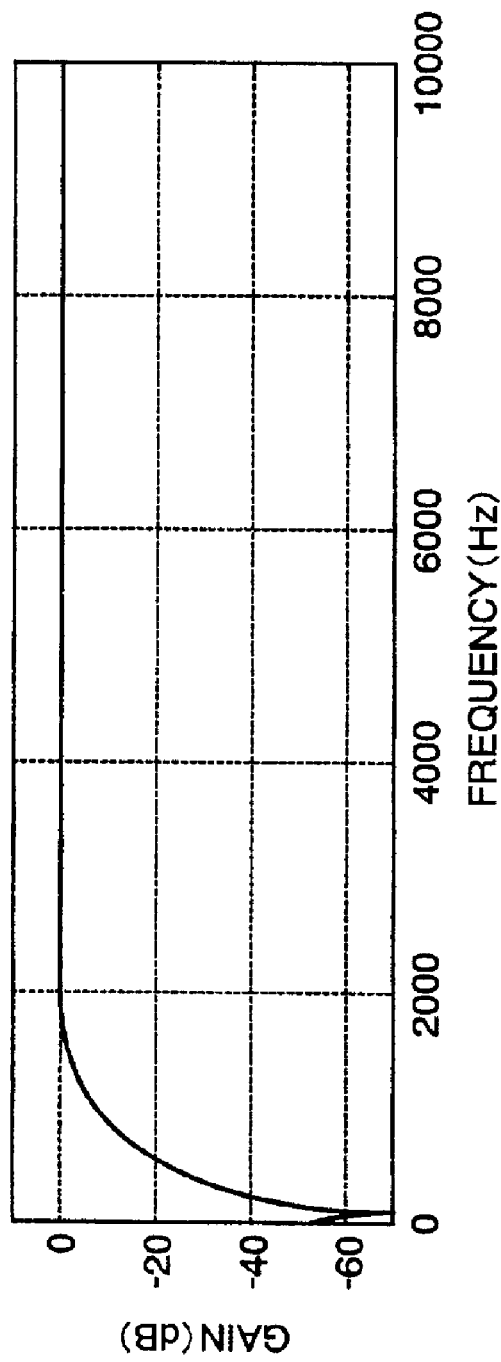
FIGS. 4A and 4B are filter characteristic diagrams of the high-pass filter.

An embodiment of the present invention will be described with reference to the accompanying drawings. FIG. 1 is a block diagram of the head positioning control system of a magnetic disk according to the present invention. In FIG. 1, a spindle motor 10 rotating at a specified speed is fixed to a base (not shown), and a magnetic disk 12 as a recording medium is fixed to the spindle motor 10. A pivot shaft 14 is provided beside the peripheral side face of the magnetic disk 12 held by the spindle motor 10 so as to be parallel with the spindle motor shaft. A carriage 16 pivotably fixed to the pivot shaft 14, and a magnetic head 20 is attached through a head support spring 18 to the distal end of the carriage 16. A voice coil motor (VCM) 22 to generate a drive force to move the magnetic head 20 is fixed to the proximal end of the carriage 16. The pivot shaft 14, the carriage 16, the head support spring 18, and the voice coil motor 22 are configured as elements of a head actuator for positioning the magnetic head 20 to a specified position, the magnetic head 20 is connected to a bus 30 through a head signal amplifier 24, a servo signal demodulator 26, and an AD converter 28, and the voice coil motor 22 is connected to the bus 30 through a power amplifier 32 and a DA converter 34.

The other parts connected to the bus 30 are a ROM 38 as memory to store various control programs, such as seek control, executed by the MPU 36, a RAM 40 as memory to store operation data and so on, and an interface controller 42. The MPU 36, the ROM 38, the RAM 40, and the bus 30 are incorporated in a control unit, and the interface controller 42 receives various kinds of commands from the controller on the host side. The interface controller 42 sends the MPU 36 a request to move the head to read or write the data on the magnetic disk according to a command received.

Meanwhile, the magnetic disk 12 has a plurality of servo sectors 44 set radially, and servo information is recorded in each servo sector 44. Each piece of servo information is reproduced as the magnetic head 20 moves over the magnetic disk 12 while the head actuator is driven. As shown in FIG. 2, the servo sector 44 is structured so that position information, including a preamble 44a, a servo ID 44b, and a servo signal 44c, is recorded. After synchronous vibration learning control is performed, a synchronous vibration learned value is recorded as synchronous vibration data 44d in a position close to the servo sector 44. The preamble 44d shows precursory information of servo information, the servo ID 44b gives the cylinder number and the sector number, and the servo signal 44c shows detailed position information by amplitude demodulation, for example.

Servo information reproduced by the magnetic head 20 is amplified by the head signal amplifier 24, and demodulated by the servo signal demodulator 26, and by this demodulation, a track number and a head position signal are generated. When the servo information is demodulated, those signals are converted by the A/D converter 28 into digital signals and are input to the control unit.

The MPU 36 in the control unit calculates a position error signal based on digital data, which has been input, and calculates a control input based on the position error signal, and outputs a control signal, generated according to the control input, to the DA converter 34. The DA converter 34 converts the digital control signal into an analog signal as a current command value. This current command value is amplified by the power amplifier 32, and output to the voice coil motor 22. When the voice coil motor 22 is driven by an output current of the power amplifier 32, the magnetic head 20 is positioned to a target position by a driving force generated by the voice coil motor 22. In other words, the MPU 36 is configured as position error signal calculating means and control input calculating means, and the head actuator is configured as positioning control means.

Before data is recorded or reproduced by the magnetic head 20, position information (servo information) for servo has been written in the magnetic disk 12, and because this position information synchronous with the rotation of the magnetic disk 12, a-information is detected as a vibration (synchronous vibration RRO) learning method is performed to extract a synchronous vibration component from the position error signal.

More specifically, as shown in FIG. 3, a synchronous vibration learning control system comprises a subtractor 47, a phase compensator (C) 46, a head actuator 48, averaging process units 50, 52, a model block 54 representing a model (Po) of the head actuator 48, an adder 56, and a filtering process unit 58.

In the synchronous vibration learning control system, position control of the magnetic head 20 is performed by obtaining a position error signal (PES) showing relative position data between position information previously recorded on the magnetic head 12 and the position (POS) of the magnetic head 20, obtaining a deviation of a target value showing the position of a track from the position error signal by the subtractor 47, calculating a control input (DAC) by the phase compensator 46 on the basis of this deviation, and driving the head actuator 48 according to this control value. In this case, in synchronous vibration learning control, track following control is carried out to fix the magnetic head 20 on the same track. In this control process, if a position error signal (PES) is obtained, this position error signal undergoes the averaging process in the averaging process unit 52.

Further, the control input (DAC) output from the phase compensator 46 is subjected to the averaging process in the averaging process unit 50. In each of the averaging process units 50, 52, to extract a synchronous vibration component, control input data or the position error signal is collected in synchronism with the rotation index, and is associated with each servo sector. Data collected associated with the servo sectors undergoes the averaging process. The synchronous vibration component processed by the averaging process unit 50 is output as RDAC, while the synchronous vibration component processed by the averaging process unit 52 is output as RPES. The synchronous vibration component RDAC is multiplied by a constant Po of the model block 54, output of the model block 54 and output RPES of the averaging process unit 52 are added together by the adder 56, and a synchronous vibration estimate RROest is obtained as an estimate of a synchronous vibration (RRO). In other words, the synchronous vibration estimate RROest can be obtained as time-series data corresponding to each servo sector by calculation of Eq. 1.

$$RRO_{est} = RPES + RPOS_{est} = RPES + P_O \cdot RDAC \quad (1)$$

Po in Eq. 1 is approximated by the double integral characteristic, and the degree of approximation of the model can be further improved according to a vibration estimate of frequency band required.

A synchronous vibration estimate RROest obtained by Eq. 1 is filtered by the filtering process unit 58, asynchronous vibration components of low frequency band included in the position error signal are removed, a synchronous vibration estimate with high precision is calculated by the filtering process unit 58.

In this case, in the filtering process unit 58 as the synchronous vibration estimate calculating means performs a process to remove a vibration component of low frequency band by using a linear phase high-pass filter. As shown in Eq. 2, a linear phase high-pass filter H (z) of finite impulse response type is used, and its impulse response h(nT) is symmetric. In Eq. 2, z denotes a operator that increments a numerical value by 1 sample, T denotes a sampling period, nT denotes sampling time, and N denotes the number of taps of the filter.

$$H(z) = \sum_{n=0}^{N-1} h(nT) \cdot z^{-n} \quad (2)$$

When an input signal is subjected to a filtering process by a high-pass filter of linear phase characteristic, the group delay MT of the filtered signal becomes constant at all frequencies. Therefore, if a filtered signal y is stored as a value y (kT−MT) after passage of a delay time, MT, for each input signal u (kT), in other words, by shifting the signal y after the filtering process for a delay time, MT, with respect to the input signal, the phase error is always zero in the relation of time-series data between input and output signals u−y. In other words, a phase error between input and output signals can be suppressed to 0. This process is expressed in the following equation 3 where an array number corresponding to time kT is designated by k.

$$y(k-M) = h(0) \cdot u(k) + h(1) \cdot u(k-1) + \ldots + h(k-(N-1)) \cdot u(k-(N-1)) \quad (3)$$

When a synchronous vibration estimate RROest is subjected to a filtering process by using a high-pass filter in the filtering process unit 58, the vibration component of low frequency band is removed. Therefore, even if the number of times of execution of the averaging process in the averaging process units 50, 52 is reduced, a synchronous vibration learned value can be obtained with high precision.

Figure 4B:
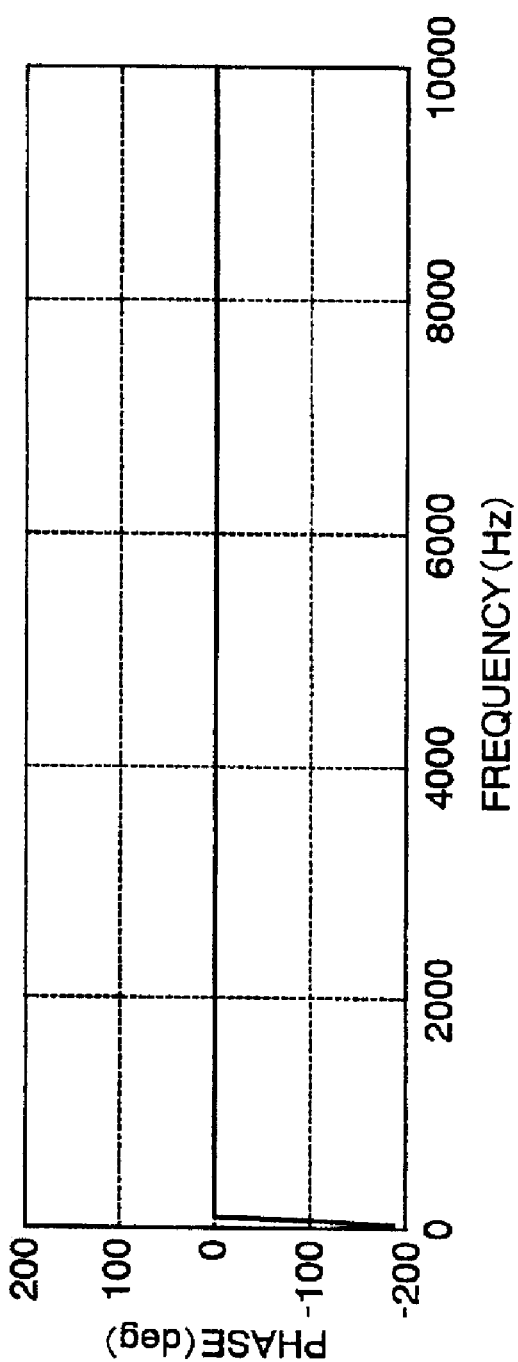

FIGS. 4A and 4B show gain and phase characteristics of the high pass filter used in this embodiment. From FIGS. 4A and 4B, it is understood that by using a high pass filter of linear phase characteristic, zero phase error is achieved in the passing band of the signal.

Figure 5A:
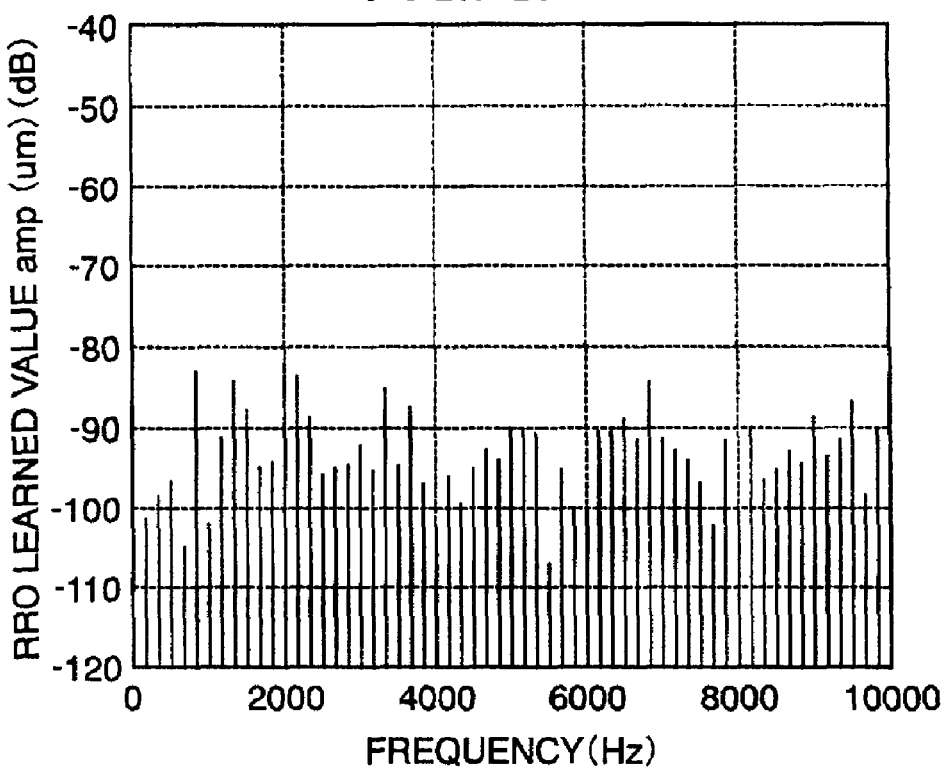
FIG. 5A is a spectral waveform diagram of synchronous vibration estimated values according to the present invention.

The frequency spectra of learned values related to synchronous vibration estimates were measured. When the averaging process was carried out three times, the result was as shown in FIG. 5A. On the other hand, when the averaging process was carried out three times using prior art, the result was as shown in FIG. 5B.

Figure 5B:
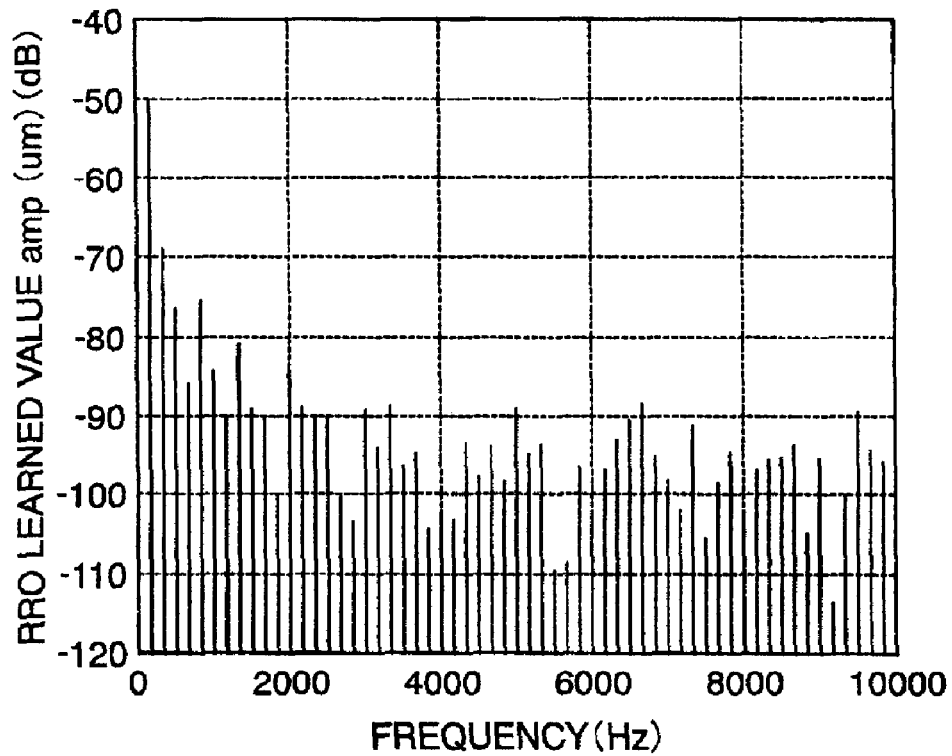
FIG. 5B is a spectral characteristic diagram of synchronous vibration estimated values in prior art.

From FIGS. 5A and 5B, it is obvious that by performing the filtering process by using a linear-phase high-pass filter, the components of low frequency band of the synchronous learned values were decreased, and errors in estimates due to asynchronous vibration components are decreased sufficiently.

After a synchronous vibration learned value was obtained, this synchronous vibration learned value is recorded as additional data 44d in a position close to a position signal recorded in the servo sector 44. In this case, because the magnetic disk drive has a write head and a read head separately, after the position signal is demodulated by the read head, the synchronous vibration learned value is written by the write head.

Figure 6:
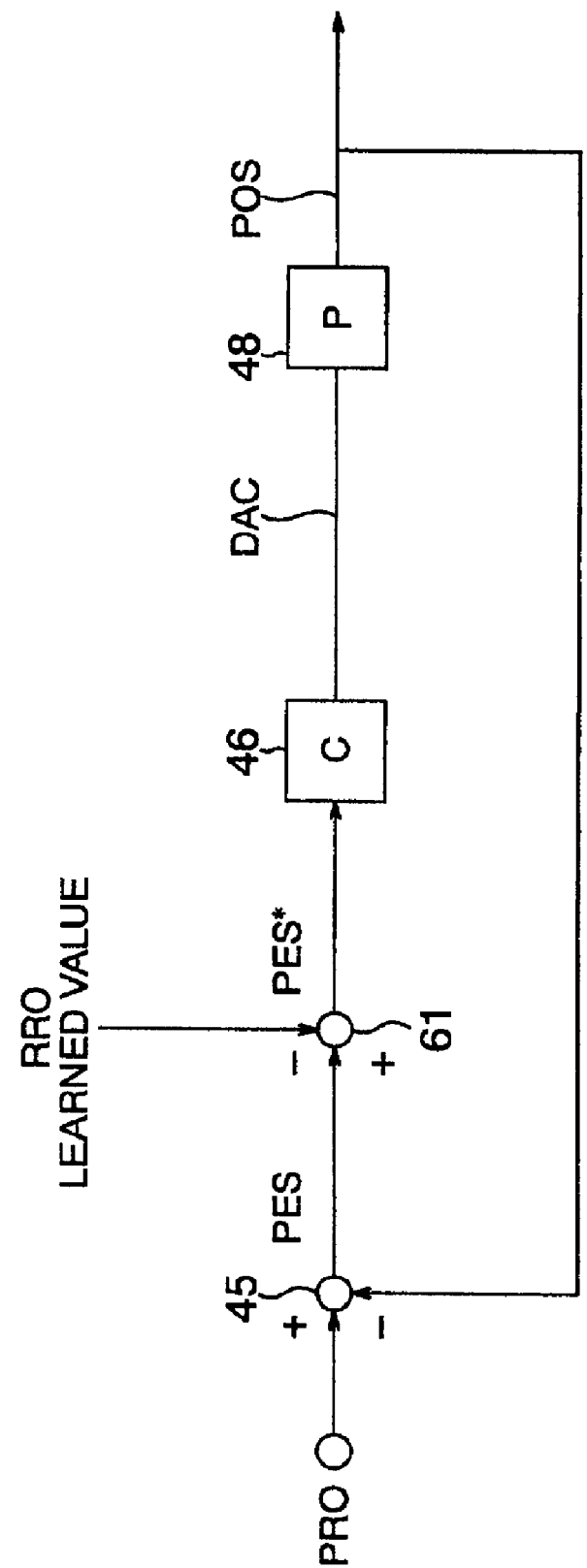
FIG. 6 is a block diagram of the synchronous vibration compensation control system according to the present invention.

After the synchronous vibration learned value was written, a control system after the synchronous vibration is compensated is formed in the control unit as shown in FIG. 6. In other words, a subtractor 61 is inserted in front of the phase compensator 46, in the subtractor 61, a subtraction of the synchronous vibration learned value from the position error signal (PES) is found, that is to say, a controlled amount PES* after the compensation of the synchronous vibration is found by adding the synchronous vibration learned value, with its sign inverted, to the position error signal PES, and according to the controlled amount, a control input (DAC) is obtained, and according to the control input, the head actuator is driven. Consequently, from a target position signal that the magnetic head 20 follows, synchronous vibration components in the passing band of the high-pass filter are removed.

Figure 7A:
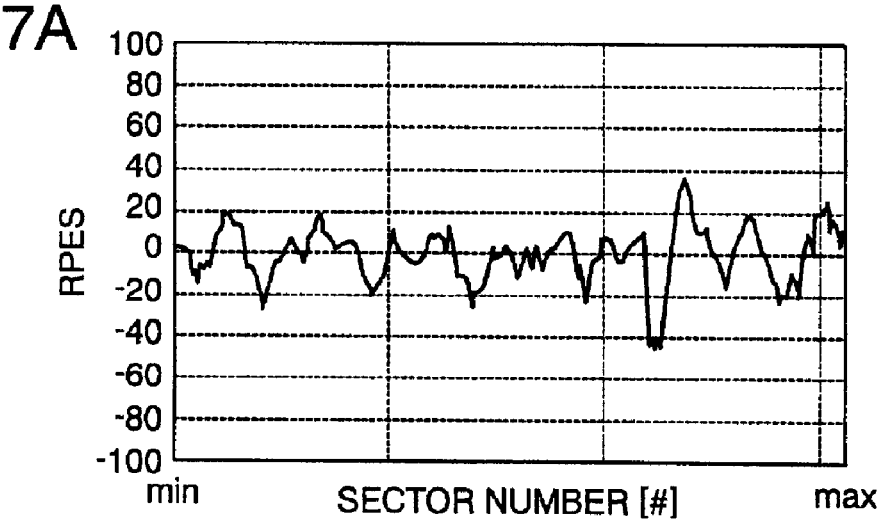
FIG. 7A is a synchronous vibration waveform diagram of position error signal (PES) when synchronous vibration compensation is not performed.
Figure 7B:
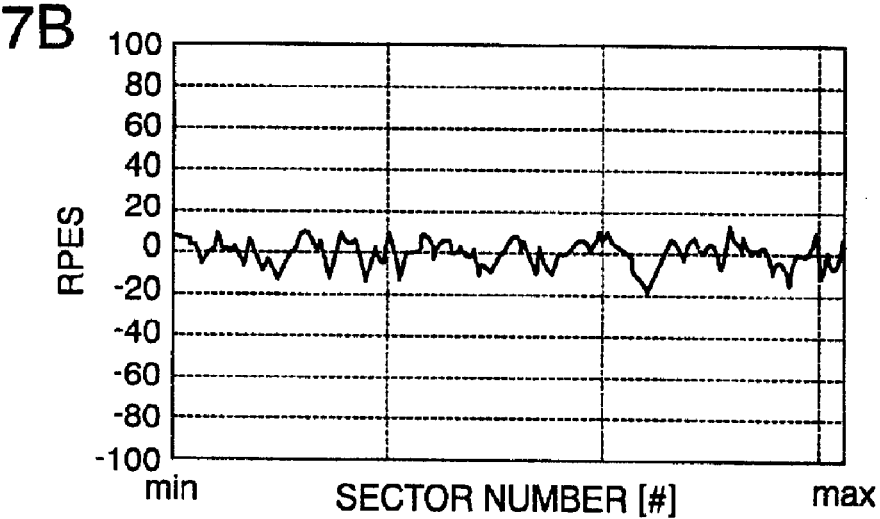
FIG. 7B is a synchronous vibration waveform diagram of position error signal (PES*) when synchronous vibration compensation is performed.
Figure 7C:
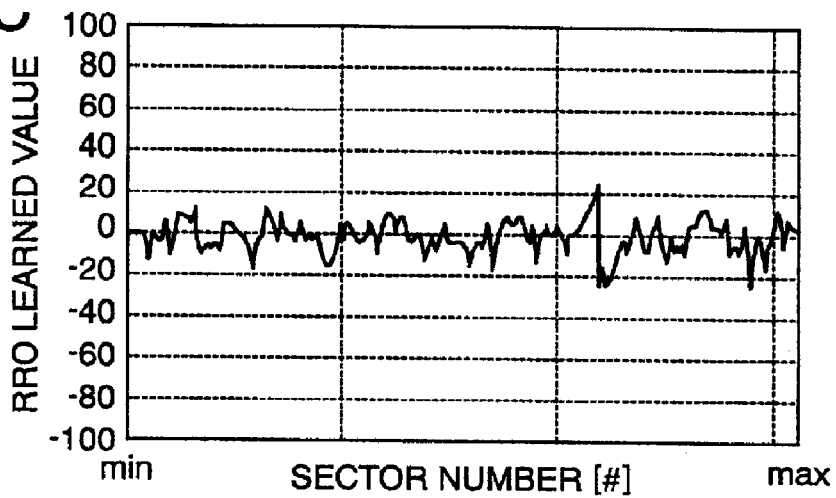
FIG. 7C is a waveform diagram of synchronous vibration learned value when synchronous vibration compensation is performed.

FIG. 7A shows a waveform of the synchronous vibration of the position error signal (PES) when synchronous vibration compensation was not applied, FIG. 7B shows a waveform of the position error (synchronous vibration of PES*) when synchronous vibration was compensated and the averaging process in the learning method was carried out three times, and FIG. 7C shows a waveform of synchronous vibration learned value when the averaging process in the learning method was carried out three times.

From FIGS. 7A to 7C, it will be seen that by executing the filtering process by a high-pass filter, results with an improvement rate of 30~50% could be achieved even when the averaging process in the learning method was executed three times, errors in estimates are reduced by a reduction of the asynchronous components in low frequency band also in the synchronous vibration learned values, which are just as were expected.

Figure 8:
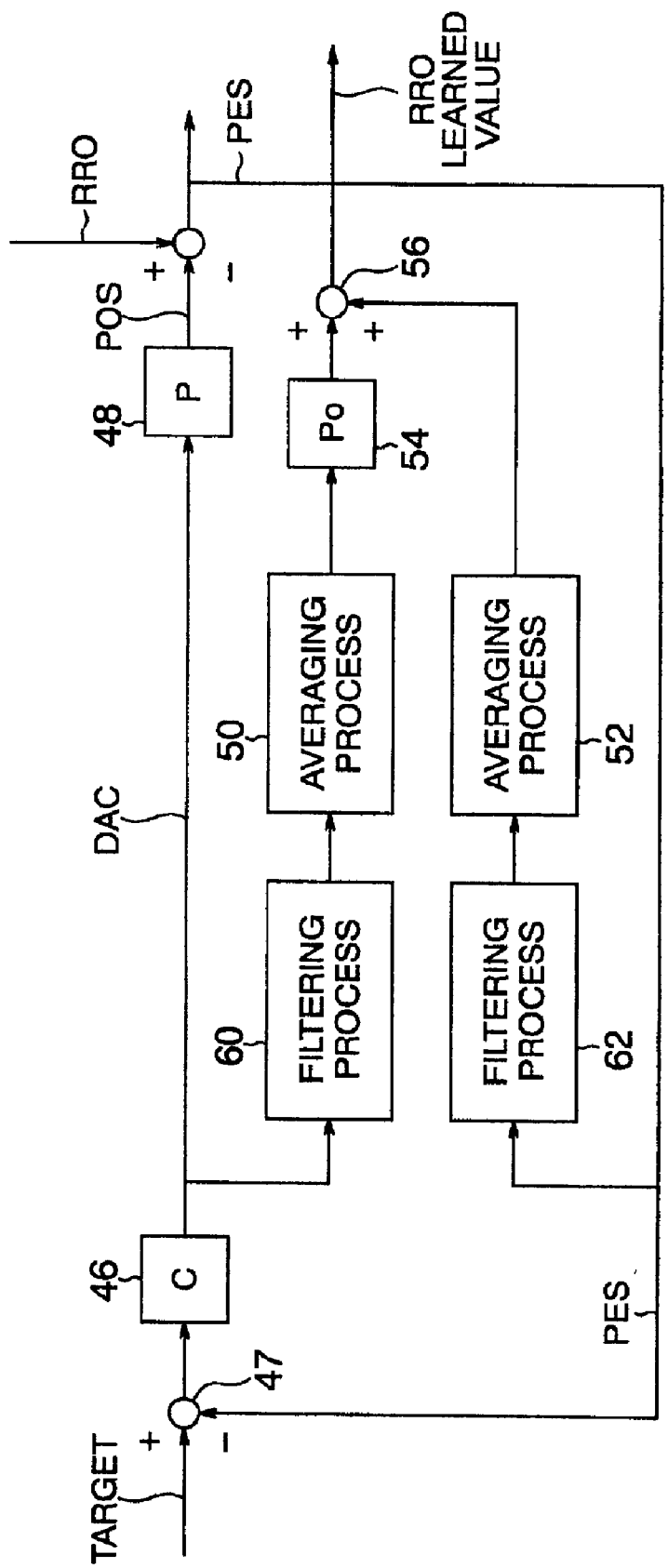
FIG. 8 is a block diagram showing a second embodiment of the synchronous vibration learning control system according to the present invention.

In the embodiment mentioned above, regarding configuration of a synchronous vibration learning control system, a case has been described where the filtering process by a high-pass filter of a linear phase characteristic is performed at a stage subsequent to the averaging process in the synchronous vibration learning method, but as shown in FIG. 8, the filtering process by a high-pass filter of linear phase characteristic may be performed at a stage before the averaging process in the synchronous vibration learning method.

Description will now be made of a second embodiment of the present invention.

As shown in FIG. 8, filtering process units 60, 62 may be provided at a stage before the averaging process circuits 50, 52 or a synchronous vibration learned value can be obtained with high precision even when the averaging process is performed three times as in the above-mentioned embodiment. In this case, the low frequency components of a signal input to the averaging process circuit are cut by the filter process units 60, 62 before the low frequency components enter the averaging process units. Therefore, it is possible to make shorter the settling time of convolution integration performed in the model block 54 than in the embodiment described above.

Next, description will be made of a third embodiment of the present invention.

Figure 9:
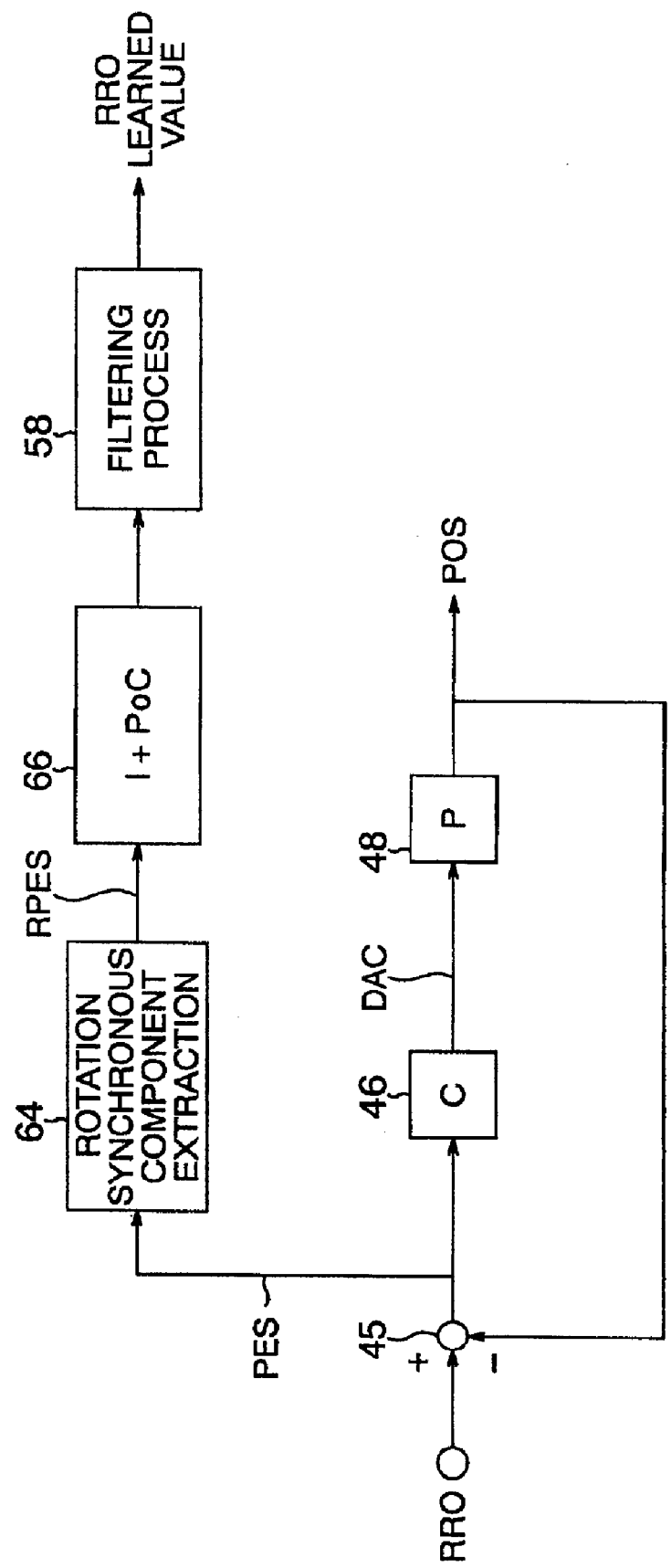
FIG. 9 is a block diagram showing a third embodiment of the synchronous vibration learning control system according to the present invention.

Further, when configuring a synchronous vibration learning control system, as shown in FIG. 9, it is possible to adopt a configuration such that a synchronous vibration component extracting circuit 64 is connected in front of the phase compensator 46, an inverse sensitivity function model 66 is connected at the output side of synchronous vibration component extracting circuit 64, and output of the inverse sensitivity function model 66 is connected to the filtering process unit 58. In this case, a synchronous vibration component is extracted from an obtained position error signal (PES) in the synchronous vibration component extracting circuit 64. After this, the inverse sensitivity function model 66 performs convolution integration with respect to the extracted synchronous vibration component by using a transfer characteristic that has added 1 to an open-loop characteristic determined by the magnetic head actuator model Po and the control unit C, to obtain a synchronous vibration estimate, and this synchronous vibration estimate is subjected to the filtering process by the filtering process unit 58 to obtain a synchronous vibration learned value. Also in this case, when a synchronous vibration estimate RROest is subjected to the filtering process by a high-pass filter in the filtering process unit 58, a vibration component of low frequency band is removed. Therefore, even if the number of processing times of the averaging process in the synchronous vibration component extracting circuit 64 is reduced, a synchronous vibration learned value free of asynchronous component of low frequency band can be obtained.

Instead of arranging the filtering process unit 58 on the output side of the inverse sensitivity function model 66, if the filtering process unit 58 is arranged on the input side of the synchronous vibration component extracting circuit 64, the same effects can be achieved.

In each of the embodiments of the invention described above, a high-pass filter of linear phase characteristic has been used as a filter to remove asynchronous components of low frequency band in the filtering process units 58, 60, and 62. Instead of the high-pass filter, a band-pass filter of linear-phase characteristic may be used. Or, a linear phase high-pass filter and a band-stop filter may be used.

FIGS. 10A and 10B show frequency characteristics when a band-pass filter is used. In this case, by learning synchronous vibration in a limited frequency band at which synchronous vibration is especially large, synchronous vibration compensation effects can be achieved by performing a small number of an averaging process. Further, when vibration components at pass-band frequencies have relatively same amplitude and phase throughout the same cylinder or throughout the heads in the same arm assembly, the same compensation value can be shared.

Figure 11A:
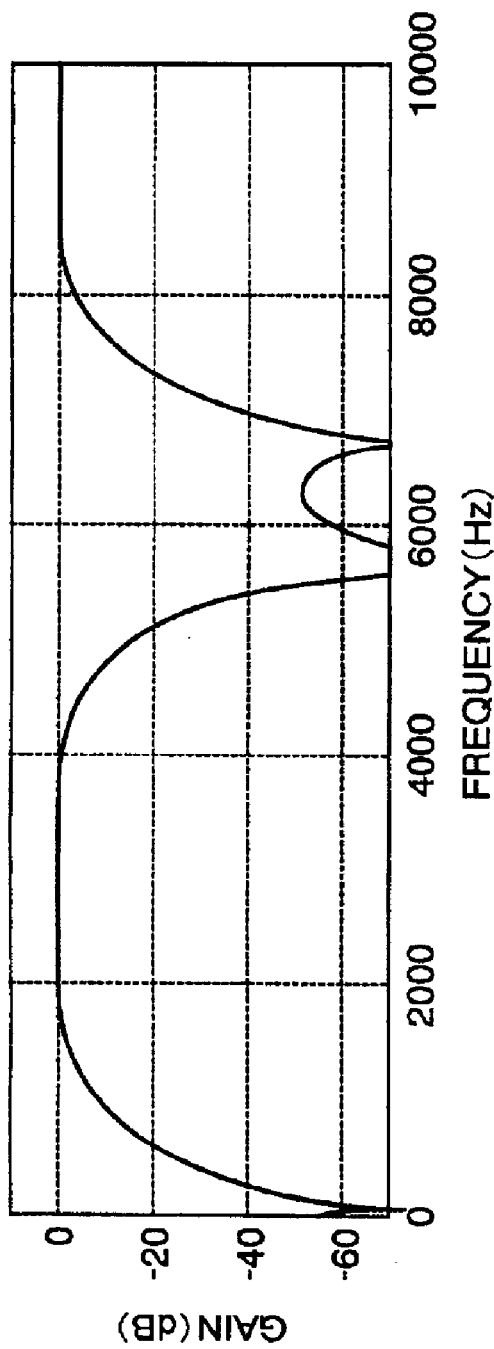
FIGS. 11A and 11B are filter characteristic diagrams of a filter with a high-pass characteristic and a band-stop characteristic.
Figure 11B:
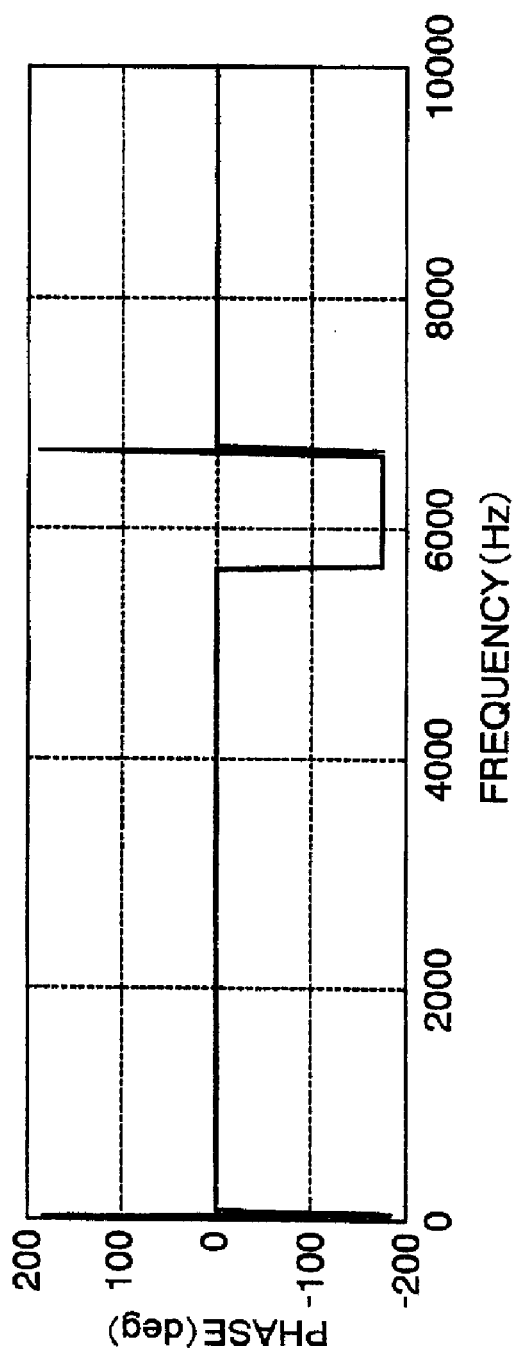

FIGS. 11A and 11B show frequency characteristics when a band-pass filter and a band-stop filter were used. In this case, if asynchronous vibrations are large and the asynchronous vibration components cannot be removed by being averaged a few times, by removing a signal component of the frequency band at issue using the band-stop filter, which obviates the need of the synchronous vibration learning operation, a synchronous vibration learned value can be obtained with high precision by a reduced number of the averaging process.

As has been described, by removing a vibration component of low frequency band by a filter of linear phase characteristic at a stage before or after the synchronous vibration learning step, and by storing a filtered signal as a value after passage of an amount of group delay due to the filtering process for each input signal to the filter, the phase error between time-series data of input and output signals is reduced to 0. Therefore, the synchronous vibration of a signal-pass band can be learned without any phase error by a small number of times of the averaging process to be executed, and error can be prevented from occurring in obtaining estimates of vibration components of low frequency band.

It should be further understood by those skilled in the art that the foregoing description has been made on embodiments of the invention and that various changes and modifications may be made in the invention without departing from the spirit of the invention and scope of the appended claims.

What is claimed is:

1. A magnetic disk drive comprising:
    position error signal calculating means for calculating, according to information reproduced from said magnetic head, a position error signal as a difference between a position signal and a target position of said magnetic head, said position signal showing relative position data of said magnetic head to record or reproduce information to or from a magnetic disk with respect to position information previously recorded on said magnetic disk;
    control input calculating means for calculating a control input based on said position error signal;
    positioning control means for positioning said magnetic head to a target position according to said control input;
    filtering process means for filtering said position error signal; and
    synchronous vibration learned value calculating means for averaging a filtered position error signal, and calculating, as a synchronous vibration learned value, a synchronous vibration estimate representing an estimate of a synchronous vibration component synchronous with the rotation of said magnetic disk, based on said signal averaged.

2. A magnetic disk drive according to claim 1, wherein said synchronous vibration estimate calculating means averages signals in the same sector as signals to be averaged, to obtain a position error signal synchronous with the rotation of said magnetic disk, and performs a convolution operation with respect to said position error signal by using a transfer characteristic formed by adding 1 to an open-loop transfer characteristic, which is determined by a model of said magnetic head actuator and the control unit, to obtain said synchronous vibration estimate.

3. A magnetic disk drive according to claim 1, wherein said filtering process means comprises a high-pass filter of linear phase characteristic as a filter to remove asynchronous components of low frequency band, and stores, for an input signal to said filter, a filtered signal as a value after passage of an amount of group delay time by said filter, to thereby suppress a phase difference between input and output signals to zero.

4. A magnetic disk drive according to claim 1, wherein said filtering process means comprises a band-pass filter of linear phase characteristic as a filter to remove asynchronous components of low frequency band, and stores, for an input signal to said filter, a filtered signal as a value after passage of an amount of group delay time by said filter, to thereby suppress a phase difference between input and output signals to zero.

5. A magnetic disk drive according to claim 1, wherein said filtering process means comprises a high-pass filter of linear phase characteristic and a band stop filter of linear-phase characteristic as filters to remove asynchronous components of specific frequency band, and stores, for an input signal to said filters, a filtered signal as a value after passage of an amount of group delay time by said filters, to thereby suppress a phase difference between input and output signals to zero.

6. A magnetic disk drive according to claim 1, further comprising learned value recording directing means for directing said magnetic head to record said synchronous vibration learned value in a position close to position information recorded on said magnetic disk.

7. A magnetic disk drive according to claim 6, further comprising deviation calculating means for calculating, as a controlled amount, a subtraction of said synchronous vibration learned value from said position error signal obtained from reproduced information of said magnetic head, wherein said control input calculating means calculates a control input based on said subtraction as a controlled amount after the synchronous vibration is compensated.

8. A magnetic disk drive according to claim 1, wherein said synchronous vibration learned value calculating means averages a filtered position error signal by execution of averaging of not more than three times.

9. A magnetic disk drive comprising:
    position error signal calculating means for calculating, according to information reproduced from said magnetic head, a position error signal as a difference between a position signal and a target position of said magnetic head, said position signal showing relative position data of said magnetic head to record or reproduce information to or from a magnetic disk with respect to position information previously recorded on said magnetic disk;
    control input calculating means for calculating a control input based on said position error signal;
    positioning control means for positioning said magnetic head to a target position according to said control input;
    synchronous vibration learned value calculating means for averaging said position error signal, and calculating a synchronous vibration estimate representing an estimate of a synchronous vibration component synchronous with the rotation of said magnetic disk, based on said signal averaged; and
    filtering process means for filtering said synchronous vibration estimate to find a synchronous vibration learned value.

10. A magnetic disk drive according to claim 9, wherein said synchronous vibration estimate calculating means averages signals in the same sector as signals to be averaged, to obtain a position error signal synchronous with the rotation of said magnetic disk, and performs convolution operation with respect to said position error signal by using a transfer characteristic formed by adding 1 to an open-loop transfer characteristic, which is determined by a magnetic head actuator model and the servo control circuit, to obtain said synchronous vibration estimate.

11. A magnetic drive according to claim 9, wherein said filtering process means comprises a high-pass filter of linear phase characteristic as a filter to remove asynchronous components of low frequency band, and stores, for an input signal to said filter, a filtered signal as a value after passage of an amount of group delay time by said filter, to thereby suppress a phase difference between input and output signals to zero.

12. A magnetic disk drive according to claim 9, wherein said filtering process means comprises a band-pass filter of linear phase characteristic as a filter to remove asynchronous components of low frequency band, and stores, for an input signal to said filter, a filtered signal as a value after passage of an amount of group delay time by said filter, to thereby suppress a phase difference between input and output signals to zero.

13. A magnetic disk drive according to claim 9, wherein said filtering process means comprises a high-pass filter of linear phase characteristic and a band-stop filter of linear-phase characteristic as filters to remove asynchronous components of specific frequency band, and stores, for an input signal to said filters, a filtered signal as a value after passage of an amount of group delay time by said filters, to thereby suppress a phase difference between input and output signals to zero.

14. A magnetic disk drive according to claim 9, further comprising learned value recording directing means for directing said magnetic head to record said synchronous vibration learned value in a position close to position information recorded on said magnetic disk.

15. A magnetic head device according to claim 14, further comprising deviation calculating means for calculating, as a controlled amount, a subtraction of said synchronous vibration learned value from said position error signal obtained from reproduced information of said magnetic head, wherein said control input calculating means calculates a control input based on said subtraction as a controlled amount after the synchronous vibration is compensated.

16. A magnetic disk drive according to claim 9, wherein said synchronous vibration learned value calculating means averages said position error signal by executing of averaging of not more than three times.

17. In a positioning control device for obtaining a position error signal as a difference signal between a position signal and a target position, said position signal showing relative position data of a positioning object to be positioned at a specified position of a rotating disk with respect to position information previously recorded on said disk; inputting said position error signal to a phase compensator; outputting an output signal of said phase compensator to a head actuator carrying said positioning object, and positioning said positioning object to said target position, a method for controlling synchronous vibration comprising the step of:
    controlling a position of said positioning object so as to follow a locus of a target track with smaller vibration than said position signal previously written when the rotation-synchronous vibration of said head actuator observed is in a specific frequency band.

18. A method for controlling synchronous vibration according to claim 17, wherein the step of controlling includes execution of averaging of said position error signal and calculating a synchronous vibration estimate representing an estimate of a synchronous vibration component synchronous with rotation of the magnetic disk, based on the signal average and filtering one of (a) the position error signal so that the filtered position error signal is averaged and (b) the synchronous vibration estimate so as to find a synchronous vibration learned value which is utilized for controlling the position of the positioning object.

19. A method for controlling synchronous vibration according to claim 18, wherein the execution of averaging includes execution for no more than three times.

20. A method for controlling synchronous vibration according to claim 19, wherein the filtering includes utilizing a filter of linear phase characteristic so as to remove a synchronous components of low frequency band.

21. A method for controlling synchronous vibration according to claim 20, wherein the filtering includes storing, for an input signal to the filter, a filtered signal as a value after passage of an amount of group delay timed by the filter to thereby suppress a phase difference between input and output signals to zero.

* * * * *